(12) United States Patent
Williams et al.

(10) Patent No.: US 7,151,125 B2
(45) Date of Patent: Dec. 19, 2006

(54) NON-WOOD FIBER PLASTIC COMPOSITES

(75) Inventors: Joseph B. Williams, Easton, PA (US);
Kenneth S. Geick, Mercerville, NJ (US); Ahmed M. Tafesh, Allentown, PA (US); Xiao Jiang, Flemington, NJ (US)

(73) Assignee: Lonza Inc., Fair Lawn, NJ (US)

( * ) Notice: Subject to any disclaimer, the term of this patent is extended or adjusted under 35 U.S.C. 154(b) by 0 days.

(21) Appl. No.: 10/424,168

(22) Filed: Apr. 18, 2003

(65) Prior Publication Data

US 2003/0229160 A1 Dec. 11, 2003

Related U.S. Application Data

(60) Provisional application No. 60/373,990, filed on Apr. 18, 2002.

(51) Int. Cl.
*C08L 97/02* (2006.01)

(52) U.S. Cl. .................................. 524/13; 524/14

(58) Field of Classification Search .................. 524/9, 524/13–14
See application file for complete search history.

(56) References Cited

U.S. PATENT DOCUMENTS

| | | | |
|---|---|---|---|
| 3,145,187 A | | 8/1964 | Hankey et al. |
| 4,458,042 A | * | 7/1984 | Espy ............................ 524/14 |
| 4,746,688 A | * | 5/1988 | Bistak et al. ................ 523/220 |
| 5,028,675 A | | 7/1991 | Kanda et al. |
| 5,486,553 A | * | 1/1996 | Deaner et al. ................. 524/13 |
| 6,011,091 A | | 1/2000 | Zehner |
| 6,031,147 A | * | 2/2000 | Gross ........................... 604/359 |
| 6,066,680 A | | 5/2000 | Cope |
| 6,103,791 A | | 8/2000 | Zehner |
| 6,662,515 B1 | * | 12/2003 | Buhrts et al. ................. 52/301 |

FOREIGN PATENT DOCUMENTS

EP 0453010 10/1991

OTHER PUBLICATIONS

Williams, J.B. et al., "Structure/Performance Characteristics of Bisamide Lubricants in Abs." Presented at the May 1997 Society of Plastics Engineers ANTEC meeting in Toronto, Canada (pp. 1-5).
Williams, J.B. et al., "Effects of Lubricants on Processing of Polymer-Wood Composites." Presented at the May 2002 Society of Plastics Engineers ANTEC meeting in San Francisco, California (pp. 1-5).

* cited by examiner

*Primary Examiner*—Peter Szekely
(74) *Attorney, Agent, or Firm*—Darby & Darby

(57) ABSTRACT

This invention is directed to an extrudable compound, an extrusion method using a polymer, a cellulosic fiber, and at least one lubricant selected from the group consisting of ethoxylated esters of hydantoins, ethoxylated esters of sorbitol and sorbitan, and ethylene bisamides made from fatty acids containing 6–10 carbons and composites manufactured through such processes which simulate conventional wood products.

Another embodiment of the invention is directed to a composition containing polymer, a cellulosic fiber from an agricultural waste product and a lubricant containing a mixture of an alkylene bisamide derived from a $C_{10}$–$C_{18}$ fatty acid and an alkaline earth salt of a fatty acid.

27 Claims, 8 Drawing Sheets

Figure 3
Effect of Lubricant on Process Ease
All formulations calibrated at ~40 lb/hr - All lube loadings at 5 phc

Figure 4
Effect of Lubricant on Zone 3 Temperature
All formulations calibrated at ~40 lb/hr

NON-WOOD FIBER PLASTIC COMPOSITES

PRIORITY DATA

This application claims priority from U.S. Provisional Application Ser. No. 60/373,990 filed Apr. 18, 2002, which is incorporated hereby by reference.

BACKGROUND OF THE INVENTION

With the rising cost of wood and the shortage of mature trees, there is a present need to find good quality substitutes for wood which will continue long into the future. Additionally, good quality wood substitutes are more durable and longer lasting than wood since they are less susceptible to termite destruction and wood rot.

Over the past several years a growing market has emerged for the use of polymer-wood composites to replace traditional solid wood products in applications such as decking, windows, fencing, automobile interiors and pallets. One key to achieving a high quality polymer-wood composite is a thorough dispersion of the cellulosic fiber in the polymer matrix. To achieve this, many leading producers of polyethylene-wood decking have found lubricants to be essential.

Agricultural residues are the parts of the plant that remain in the fields after a crop is harvested. Examples of such residues include, but not limited to, those parts of the plant left in the fields after the harvesting of straw, oak, rice, and corn. After harvest, the agricultural residues are usually burned or plowed into the ground as compost. In place of burning or plowing these residues into the ground, these annually renewable lignocellosic fibers or lignocellosics have an outstanding potential of being used as a fiber source in the production of a non-wood fiber composites.

U.S. Pat. No. 6,011,091 teaches a cellulosic composite containing from 60 to 70% cellulosic material, from 30 to 40% polyvinyl chloride material and up to 4% by weight of polar thermosetting material. Common commercial lubricants such as calcium esters, e.g., stearate, paraffin wax and amide wax can be used. However, vinyl based thermoplastics are generally more difficult to process than olefin based thermoplastics.

U.S. Pat. No. 6,066,680 describes an extruded composite formed from foamable plastic containing a polymer resin and wood flour particles. A two step process is taught wherein the wood flour particles are encapsulated by the resin and pelletized, and then the pelletized pieces are mixed with additional resin and blowing agents. Lubricants such as stearic acid, calcium stearate, ester wax, and AC-629A Oxidized Polyethylene wax can be included.

The polymer resins described are polyvinyl chloride, chlorinated polyvinyl chloride and polystyrene.

U.S. Pat. No. 6,103,791, which is a continuation of U.S. Pat. No. 6,011,091 discloses a cellulosic composite containing from 50 to 65% cellulosic material, from 25 to 30% polyvinyl chloride material and up to 4% by weight of polar thermosetting material. These composites are considered to have improved weatherability. Also, they appear to adhere better to the wood material without the need for adhesives or tie layers.

Therefore, a present need exists for a superior polymer-wood composite based on an easily processable polymer which has better weatherability and dimensional stability than contemporary products on the market.

BRIEF SUMMARY OF THE INVENTION

This invention is directed to an extrudable and extruded polymer-cellulosic fiber composite comprising a polymer, e.g., high density polyethylene (HDPE) admixed with cellulosic fiber and at least one lubricant selected from the group consisting of ethoxylated esters of hydantoins, ethoxylated esters of sorbitol and sorbitan, and ethylene bisamides made from fatty acids containing 6–10 carbons. It has now been discovered that these classes of compounds are better lubricants than the current ethylene bisstearamide (EBS)/zinc stearate (ZnSt) blends used in wood. The advantages of these lubricants versus the EBS/ZnSt blends are increased output per percent extruder torque, reduced temperatures in the extruder, improved dimensional stability of extruded profiles, and improved appearance of extruded profiles.

A second composite of the invention is a polymer-cellulosic fiber composition comprising a polymer admixed with a cellulosic fiber, wherein the cellulosic fiber is an agricultural waste product, and the lubricant is a mixture of an alkylene bisamide and an alkaline earth or zinc salt of a fatty acid (e.g., zinc stearate).

Another embodiment of the invention is a process for the preparation of a polymer-cellulosic composite which includes (a) mixing a polymer, cellulosic fiber, and lubricant to form a mixture, (b) drying the mixture obtained in step (a) for about 10 to about 16 hours at a temperature of from about 100 to about 120° C. and a pressure of from about 680 to about 720 mm Hg, to a moisture (water) content of less than 1 wt. %, based on the total weight of the composition, (c) extruding the mixture obtained in step (b) at a temperature not more than about 170° C., (d) passing the extruded profile through a cooling chamber containing a plurality of water sprays, and (e) cutting and collecting the extrudate. Still another embodiment of the invention is a composition prepared by the aforementioned process.

DETAILED DESCRIPTION OF THE INVENTION

The polymers used in the composition are virgin polymers which include, but are not limited to, polyolefins and polyvinyl compounds as for example HDPE, LDPE, LLDPE, UHMWPE, polypropylene (homo- and copolymer), PVC, and combinations thereof. A preferred polyolefin is HDPE, available as a "barefoot" (no additives) reactor powder (Equistar® LB0100-00) having a 0.4 Melt Index (MI). This polyolefin is a product from Equistat Chemicals LP of Houston, Tex. The composition of the invention contains from about 30 to about 70 wt. % weight of polymer, based upon the weight of the total composition, and preferably from about 40 to about 60 wt. %.

A wide variety of cellulosic fibers can be employed in the process of the present invention. Illustrative cellulosic fibers include, but are not limited to, wood and wood products, such as wood pulp fibers; non-woody paper-making fibers from cotton, from straws and grasses, such as rice and esparto, from canes and reeds, such as bagasse, from bamboos, from stalks with bast fibers, such as jute, flax, kenaf, cannabis, linen and ramie, and from leaf fibers, such as abaca and sisal. One or more cellulosic fibers may be used. Suitably, the cellulosic fiber used is from a wood source. Suitable wood sources include softwood sources such as pines, spruces, and firs, and hardwood sources such as oaks, maples, eucalyptuses, poplars, beeches, and aspens.

The cellulosic fibers also include agricultural wastes. Examples include, but are not limited to, straw, corn stalks, rice hulls, wheat, oat, barley and oat chaff, coconut shells, peanut shells, walnut shells, jute, hemp, bagasse, bamboo, flax, and kenaff, and combinations thereof.

The cellulosic fibers may be screened through various screens, e.g., a 30-mesh or a 40-mesh screen, to obtain a mixture of different size fibers. The size of the fibers used in the composition of the invention range from about 10 to about 100 mesh, and preferably from about 40 to about 100 mesh.

The wood flours used in the composition include soft and hard woods and combinations thereof. Preferable wood flours are oak and pine, available as Oak 4037 (40 mesh) and Pine 402050 (40 mesh), respectively from American Wood Fibers of Schofield, Wis. Another preferred wood flour is maple.

The composition contains from about 70 to about 30 wt. % of cellulosic fiber, based upon the weight of the total composition, and preferably from about 60 to about 40 wt. %.

The lubricants of the invention improve the internal and external lubricity of the plastic blends. The internal lubricity enhances the dispersion of the reinforcing filler in the polymer, thus improving the physical properties and increasing the extruder output. The principal benefit of the external lubricity is to improve the surface appearance of the extruded article by reducing the force needed to move the extrudable composition through the dye. The lubricant may be diamide (e.g., ethylene bisamide), an ethoxylated ester of hydantoins, or ethoxylated esters of sorbitol or sorbitan, and combinations thereof. The composition contains from about 1 to about 7 wt. % of lubricant, based upon the weight of the total composition. Preferred embodiments contain from about 2 to about 4 wt. % lubricant for HDPE/pine compositions and from about 3 to about 6 wt. % lubricant for HDPE/oak compositions.

The ethoxylated esters of hydantoin used as lubricants in the invention have the formula:

wherein both $R_1$ may be independently selected from H, $CH_3$ and $C_2H_5$, provided that not more than one $R_1$ may be H; $R_2$ and $R_3$ may be saturated or unsaturated $C_{12}$ to $C_{22}$ alkyl radicals; and x+y are from 0 to 60. Preferred ethoxylated esters of hydantoin are compounds in which both $R_1$'s are $CH_3$; x+y are from 15 to 40; and $R_2$ and $R_3$ are stearate or oleate radicals.

Sorbitol is a linear, $C_6$ sugar alcohol. When sorbitol is ethoxylated and esterified it maintains its linear $C_6$ structure. These ethoxylated sorbitol esters have the following structure:

where x+y+z+a+b+c=5 to 40

$R_1$, $R_2$, $R_3$, $R_4$, $R_5$ and $R_6$ are independently selected from H or acyl groups. The acyl groups may be derived from saturated or unsaturated alkyl acids having from $C_{16}$ to $C_{22}$.

Sorbitol readily forms esters of tetrahydropyran and tetrahydrofuran. These esters are ethoxylated to form ethoxylated sorbitan esters. One of the major structures of these esters is shown below:

wherein w+x+y+z may be from 5 to 40 and the R groups are as defined above.

Preferred ethoxylated esters of sorbitol of the present invention are w+x+y+w=20 to 40.

The ethylene bisamides are derived from $C_6$ to $C_{10}$ fatty acids and have the formula:

where $R$—$C(=O)$— is $C_6$ to $C_{10}$ acyl, and R' is H or $C_1$–$C_8$ alkyl.

In the second composite of the invention the composition comprises a polymer, agricultural waste and a lubricant comprising a mixture of two components, viz., an amide and an alkaline earth salt of a fatty acid.

The first component of the lubricant may be an ethylene bisamide from $C_{10}$ to $C_{18}$ fatty acids. These bisamides have the following formula:

where R—C(=O)— is $C_{10}$ to $C_{18}$ acyl, and R' is H or $C_1$-$C_8$ alkyl. Preferred ethylene bisamides are ethylene bisoctanamide, ethylene bisdecanamide, and combinations thereof. Examples include, but are not limited to EBS, available as Acrawax® C from Lonza Inc. of Fair Lawn, N.J. The second component of the lubricant may be an alkaline earth or zinc salt of a fatty acid. Preferred alkaline earth or zinc salts of a fatty acid include, but are not limited to, zinc stearate and calcium stearate.

The lubricant is preferably a mixture of EBS and ZnSt. The mixture contains from about 20 to about 100 wt. % of EBS and up to about 80 wt. % of ZnSt, based upon the weight of the total mixture. The ratio of the EBS to ZnSt may be from about 1:0, preferably from 1:1 to 1:3.

Coupling, compatabilizing, or mixing agents may advantageously be present in the polymeric composite. These additives may be present in an amount of from about 0.01 to about 20 wt. % based on the total weight of the composition, preferably, about 0.1 to about 10 wt. %, and most preferably from about 0.2 to 5 wt. % to achieve improvements in the physical, mechanical and thermal characteristics of the materials. A preferred compatabilizer is maleated polypropylene. Talc may be present in an amount from about 2% to about 10%, based on the total weight of the composition. Other additives can be used, including viscosity stabilizers, inorganic fillers, processing aids, and coloring agents.

In addition to extrusion, the compositions of this invention may be injection molded to produce commercially usable products. The resultant product has an appearance similar to wood and may be sawed, sanded, shaped, turned, fastened and/or finished in the same manner as natural wood. It is resistant to rot and decay as well as termite attack and may be used, for example, as decorative moldings inside or outside of a house, picture frames, furniture, porch decks, window moldings, window components, door components, roofing systems and other type of structural member.

The following examples illustrate the invention without limitation. Examples 1 and 2 are directed to the first composite of the invention which applies to all cellulosic material, while Example 3 is directed to the second composite which relates to agricultural waste. All parts and percentages are given by weight unless otherwise indicated.

The Extrusion Process

In all of the examples, the composite materials were mixed in a ten liter Henschel mixer for about three minutes at 1800 rpm. After mixing the composites were dried for 16 hours at 100° C. in vacuum ovens with vacuums of about 685 to about 710 mm Hg. The dried compositions were extruded through a rectangular profile through a 38.1×12.7 mm die in a 30 mm Werner & Pfleiderer co-rotating twin screw extruder. The extruder set temperature profile from the feed section to the die was 140°, 150°, 150°, 150°, 140° C. The composite material was fed to the extruder using a K-Tron S200 volumetric single screw feeder with a set feed rate of either 11 kg/hr, 16 kg/hr or 18 kg/hr. The screw speed was set at 175 rpm. The extruded profile passed through a 0.65 m cooling chamber containing three sets of water sprays before being cut and collected.

The extruder torque and the output are combined in a "process ease" variable, which is defined as output/% torque. The actual temperatures in zone 3 are noted because zone 3 is the area of highest shear in the extruder.

EXAMPLE 1

HDPE-Oak Wood Flour

In this example, the extrudable composite contained 40% HDPE (Petrothene reactor powder (Equistar® LB0100-00) and 60% Oak 4037 (40 mesh) available from American Wood Fibers of Schofield, Wis. The control lubricants and the lubricants in the following tables were added to the extrudable composite in amount of at 5 phc (parts per hundred) based on total HDPE/Oak Flour.

The control lubricants consisted of EBS, ZnSt, and mixtures thereof. Composites were made using EBS alone, ZnSt alone, a mixture of approximately 1:1 of EBS and ZnSt (designated as "one pack"), and EBS and ZnSt added separately to the composite (designated "mixed separately").

Table 1 shows the lubricants which are within the scope of the instant invention. Those in Table 2 are for comparative purposes:

TABLE 1

(Lubricants of the Invention)

| Lubricant System | Ingredients |
| --- | --- |
| A | POE[1] 15 di(2-hydroxyethyl-)5,5 DMH distearate |
| B | POE 15 di(2-hydroxyethyl-)5,5 DMH monooleate |
| C | Ethylene Bis ($C_{8/10}$) amide |
| D | POE 20 sorbitan monostearate |
| E | POE sorbitan monooleate |
| F | POE 5 sorbitan monooleate |
| G | POE 40 sorbitol hexatalate |
| H | POE 40 sorbitol tetraoleate |
| I | POE 20 sorbitol trioleate |
| J | POE 20 sorbitol monolaurate |

[1]POE is polyoxyethylene.

TABLE 2

(Comparative Lubricants)

| Lubricant System | Ingredients |
| --- | --- |
| Control 1 | 50:50 EBS/ZnSt (one pack) |
| Control 2 | 50:50 EBS/ZnSt (mixed separately) |
| Control 3 | 1:2 ESB/ZnSt (one pack) |
| Control 4 | 1:2 EBS/ZnSt (mixed separately) |
| K | Ethylene bisoleamide |
| L | Stearyl stearate |
| M | Distearyl phthalate |
| N | Pentaerythritol adipate stearate |
| O | Ethylene glycol distearate |
| P | Pentaerythritol tetrastearate |
| Q | Glycerol tristearate |
| R | PEG 400 monostearate |
| S | Glycerol monooleate |
| T | Glycerol dioleate |

Figure 1:
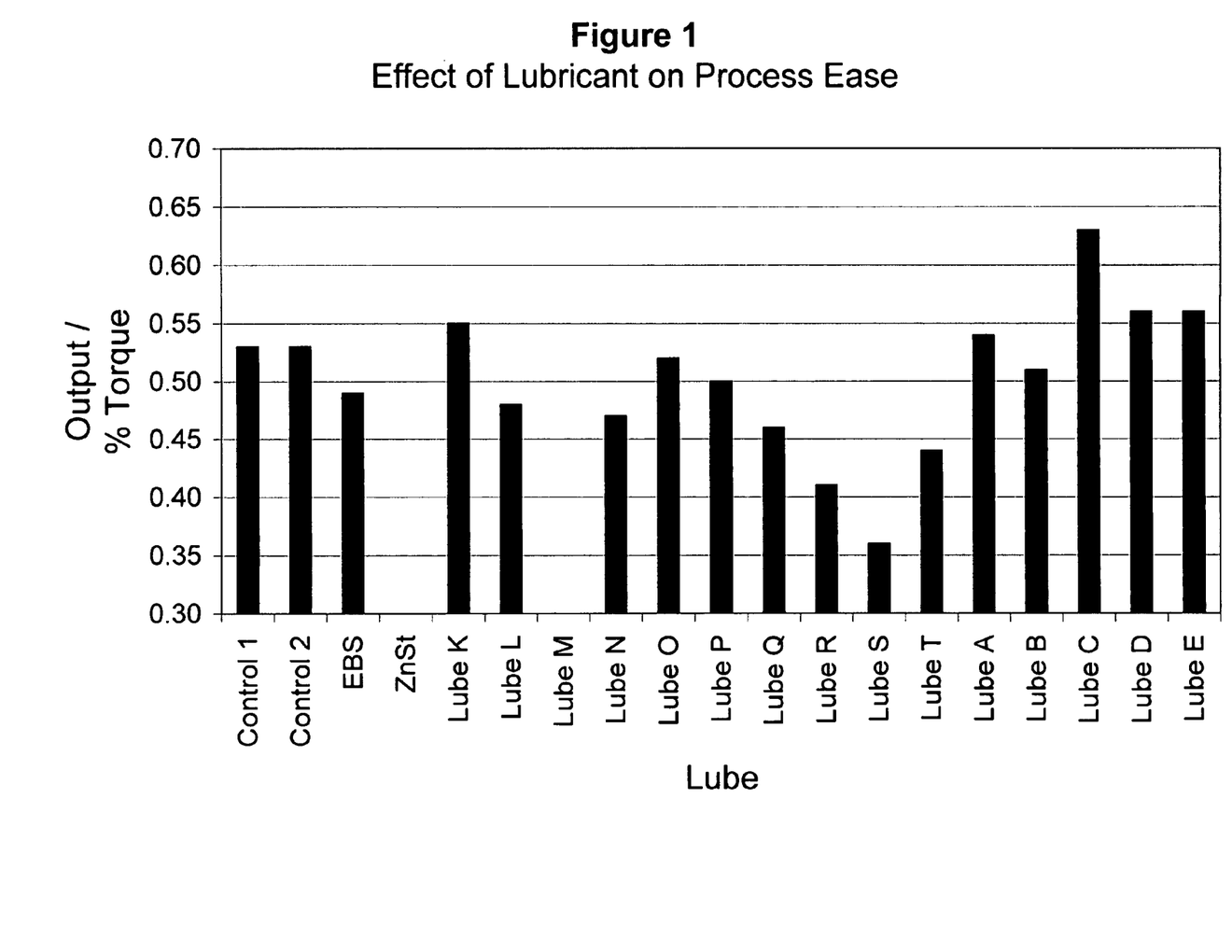
FIG. 1 depicts the effect on process ease of various lubricant systems in a HDPE/oak flour composite.
Figure 2:
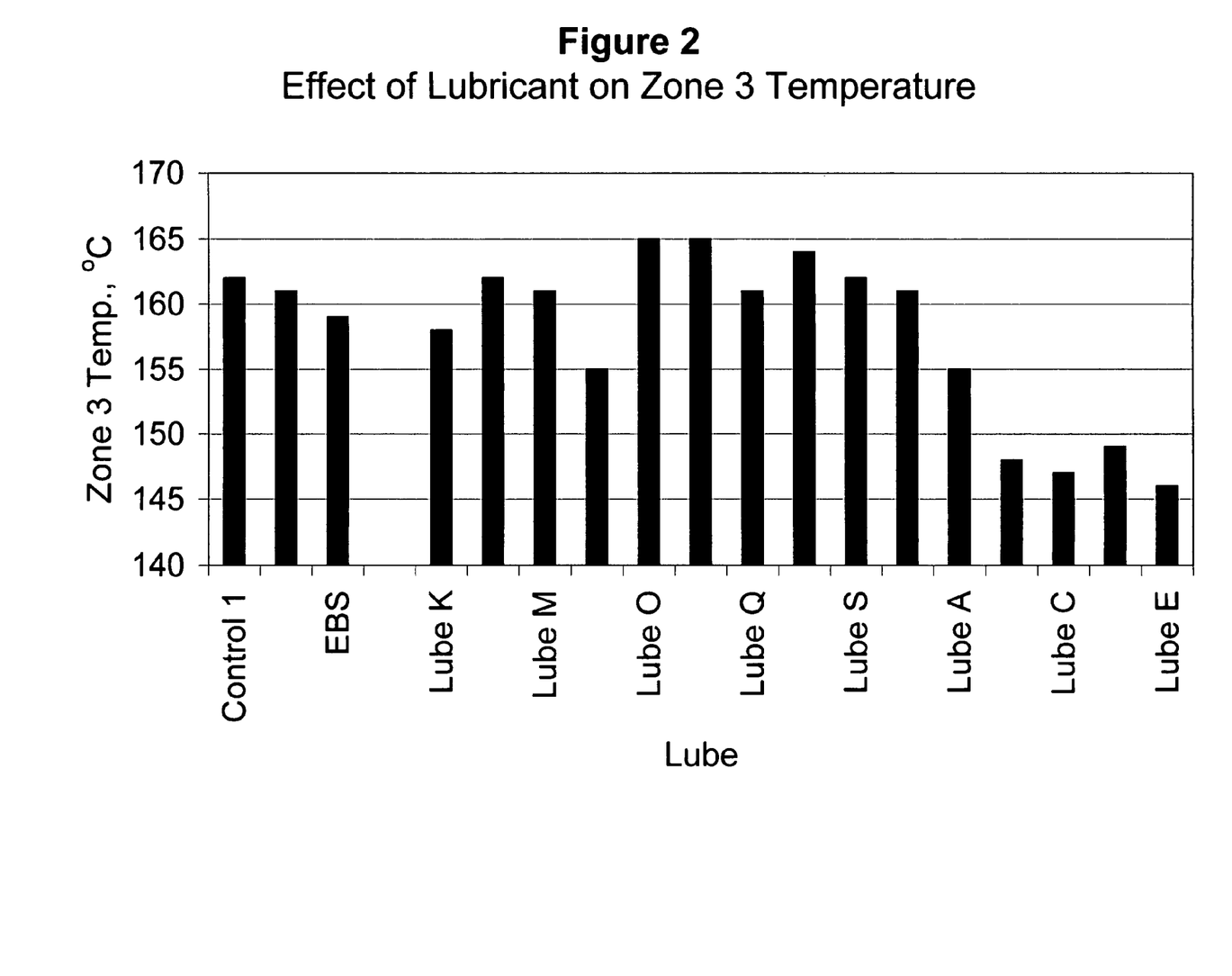
FIG. 2 illustrates the effect of various lubricant systems in a HDPE/oak flour composite on zone 3 temperatures.

The results of screening studies for the different lubricant packages in HDPE/Oak Flour using a feed rate of 11 kg/hr are shown in FIG. 1. The zone 3 temperatures are shown in FIG. 2. The set temperature in zone 3 was 150° C. for all of the runs. No coherent output profiles could be produced using ZnSt or Lube M.

Lubes A and C had process ease values higher than the controls. Lubes A, B, and C, D and E produced better looking profiles than the controls, i.e., they had better surfaces and more uniform dimensions. The process ease value for Lube B was comparable to the process ease values for Comparative Lubes O and P; however, the zone 3 temperature for Lube B was significantly lower than the zone 3 temperatures for Comparative Lubes O and P. The profile containing Lube B had the best appearance.

Comparative Lube K had the best process ease of all the comparative lubricants and controls. Lubes C, D, and E had better process eases than Comparative Lube K. Although Lubes A and B did not have as good as process ease values as Comparative Lube K, Lubes A and B had substantially less zone 3 temperatures than Comparative Lube K.

As shown in FIG. 2, the indicated temperatures for compositions containing most of the comparative lube packages and the controls were 160° C. or higher. Lubes B, C, D and E reduced the measured temperatures in zone 3 more than any of the other lubes studied. Comparative Lube N had the same zone 3 temperature as Lube A, but Comparative Lube N had a much lower process ease value than Lube A. The zone 3 temperatures measured for Lubes B, C, and E were actually lower than the set temperature.

Figure 3:
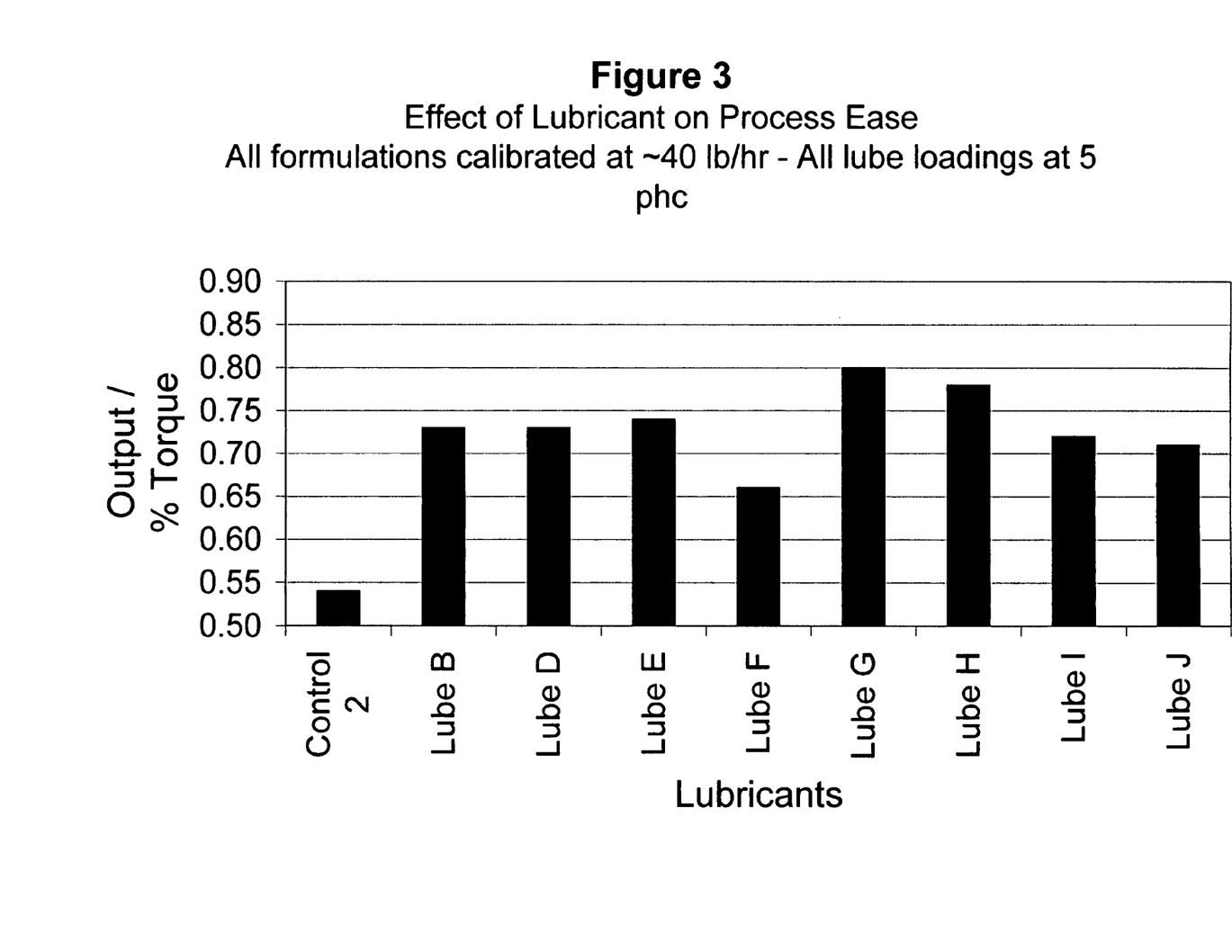
FIG. 3 shows the effect on process ease of Lubricant Systems B–J in a HDPE/oak flour composite.
Figure 4:
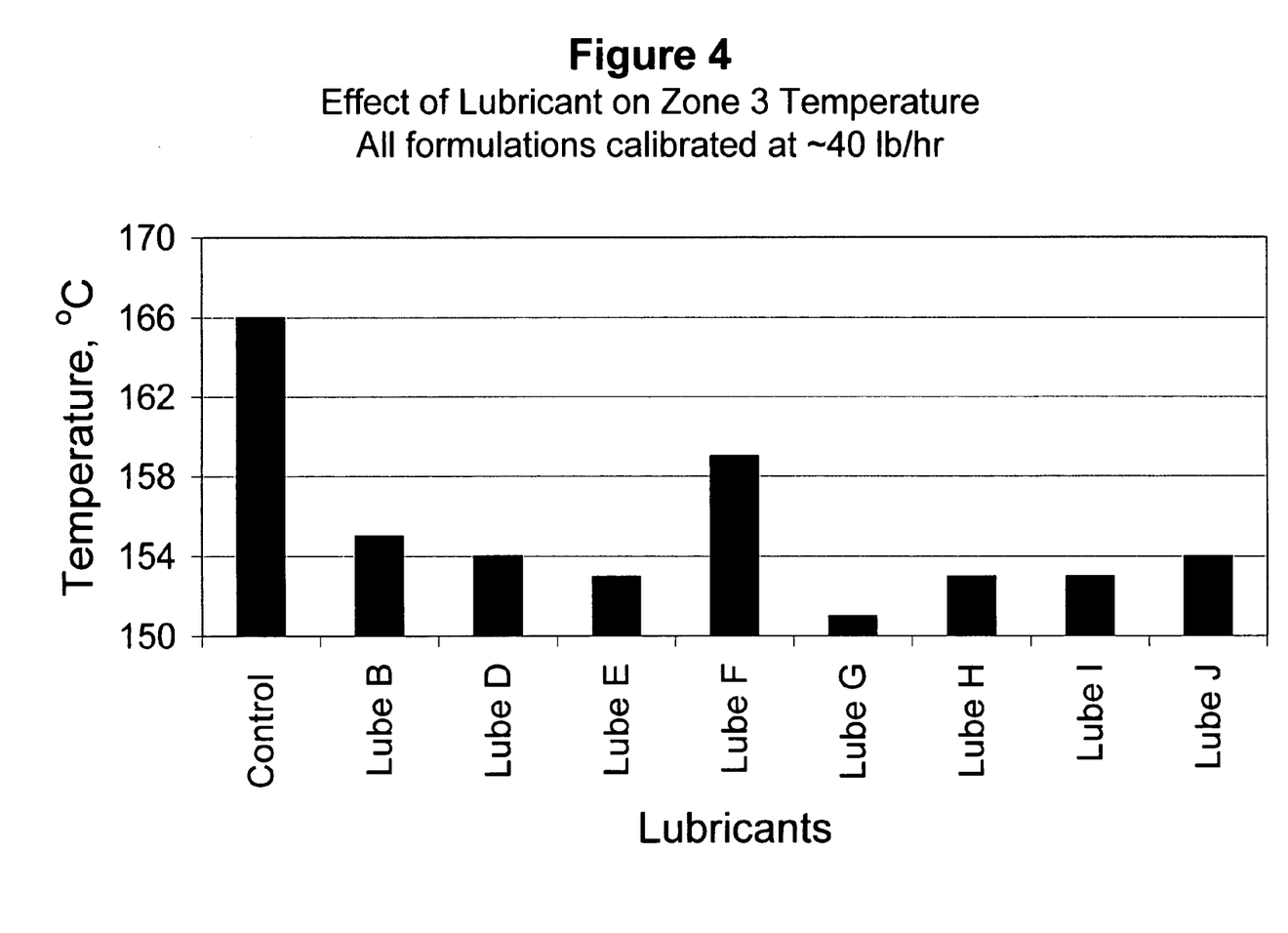
FIG. 4 depicts the effect of Lubricant Systems B–J in a HDPE/oak flour composite on zone 3 temperatures.

Further runs were made with the lubricants B, D, E, F, G, H, I, and J and HDPE/oak flour mixtures at an extruder feed rate of 18 kg/hr. The process ease results are shown in FIG. 3 and the accompanying zone 3 temperatures are found in FIG. 4. Lubricants B, D, E, F, G, H, I, and J had significantly higher (better) process ease values than the control, i.e., the value of the output divided by the % torque is higher. Lubricants B, D, E, F, G, H, I, and J all had substantially lower zone 3 temperatures than the control. Therefore, all of the lubricants of the present invention had better process ease and lower zone 3 temperatures than the control.

EXAMPLE 2

HDPE-Pine Wood Flour

The extrudable composite in this example contained 40% of the same HDPE reactor powder as used in Example 1, 60% Pine 402050 (40 mesh) available from American Wood Fibers of Schofield, Wis., and 6 phc of Polar Minerals 9610 talc, available from Polar Minerals of Mentor, Ohio. A number of the better lubes in the foregoing HDPE-Oak composites were evaluated in the HDPE-Pine Flour composite. The extruder speed for these runs was 175 rpm with the feed rate set at 16 kg per hour. The control lubricant package for these formulations contained 1 phc EBS and 2 phc ZnSt as a one pack system (designated as "Control 3") and as mixed separately (designated as "Control 4").

Figure 5:
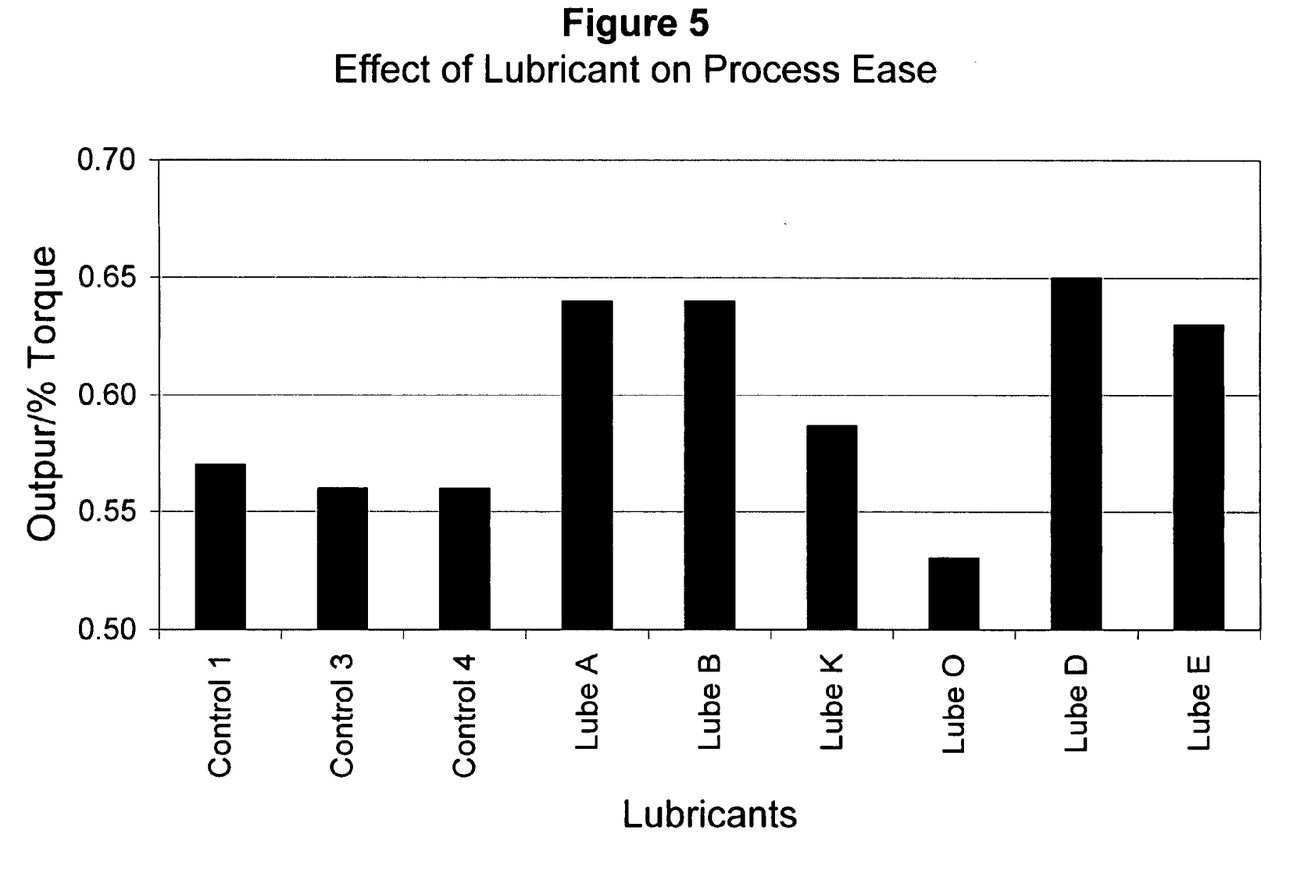
FIG. 5 shows the effect of various lubricant systems in a HDPE/pine flour composite on process ease.

The process ease results are shown in FIG. 5. They are similar to those in the HDPE-Oak formulations. The one pack lube and the EBS and ZnSt added separately, within experimental error, had the same process ease value. Lubes A, B, D and E had higher process ease values than the controls and Comparative Lubricants K and O. The appearance of the profiles containing the one pack and separately added lubes was identical, while those containing Lubes A, B, D and E had a better appearance than the controls.

Figure 6:
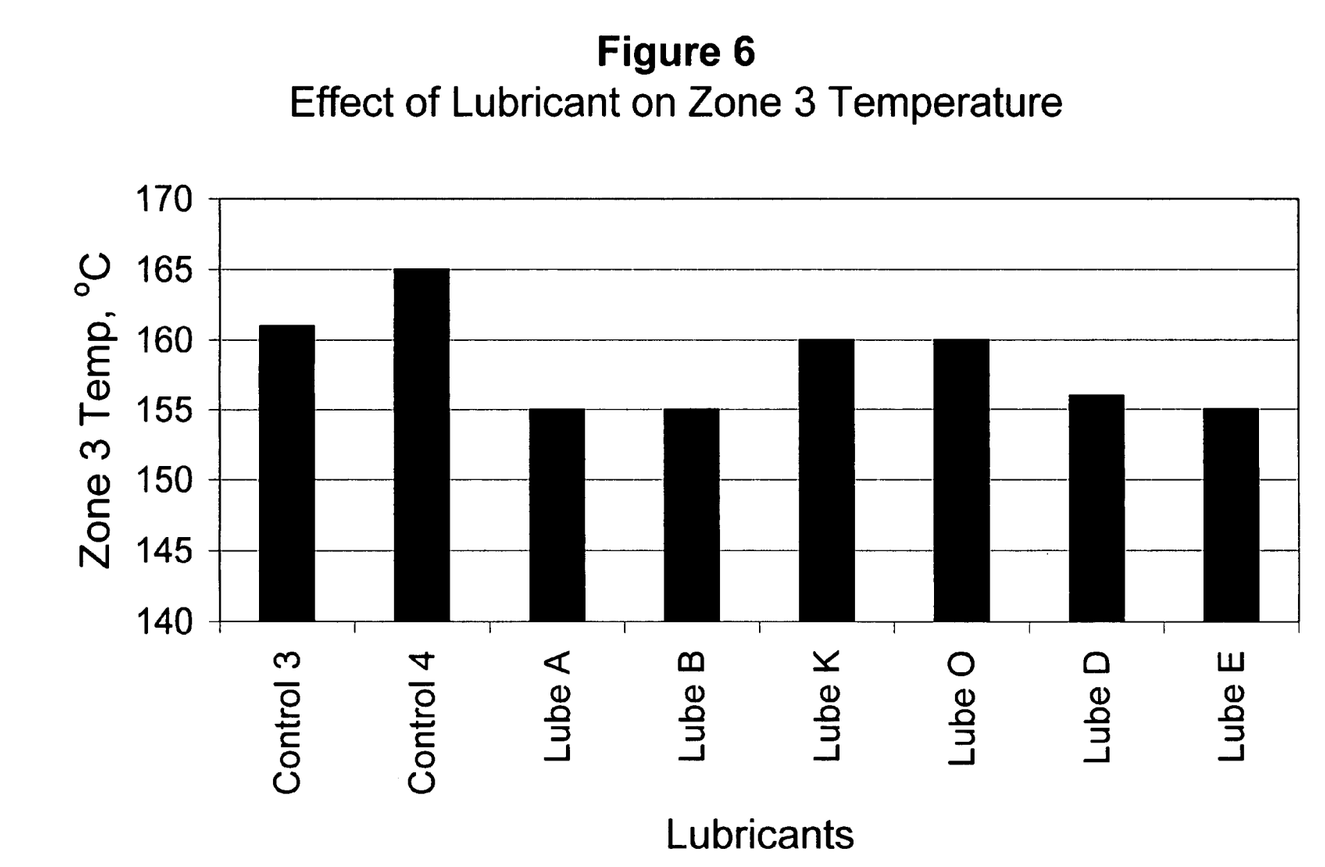
FIG. 6 depicts the effect of various lubricant systems in a HDPE/pine flour composite on zone 3 temperatures.

The zone 3 temperature results were also similar to those obtained in the HDPE-Oak runs. These are shown in FIG. 6. The zone 3 temperatures for the profiles containing the one pack lube and the lube with the separately added EBS and ZnSt were, within experimental error, the same. However, the zone 3 temperatures for Lubes A, B, D, and E were significantly lower than the controls and Comparative Lubes K and O.

Figure 7:
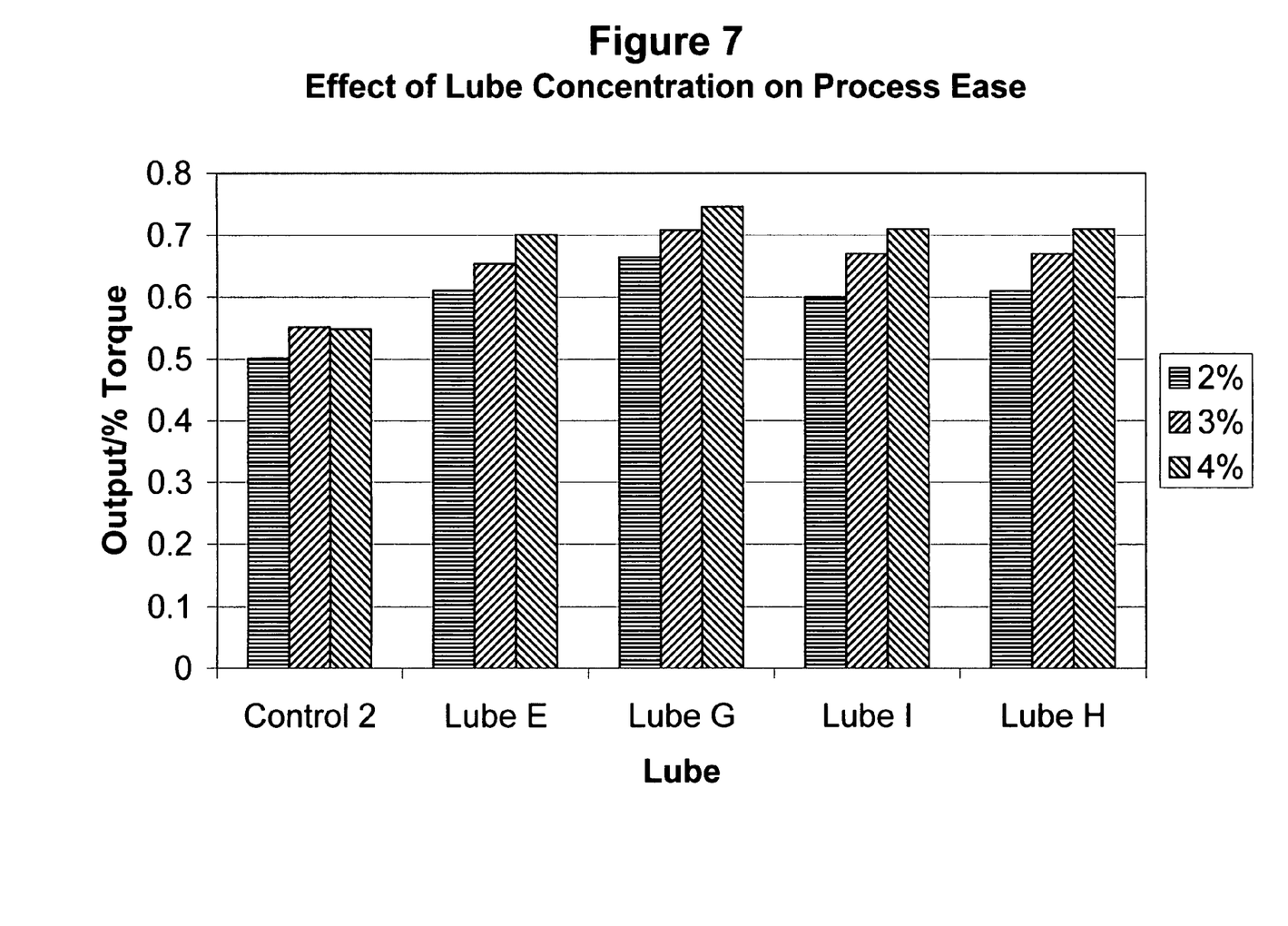
FIG. 7 illustrates the effect of Lubricant Systems E, G, I and H in a HDPE/pine flour composite on process ease.

In another series of runs, a control lubricant of EBS and ZnSt in a ratio of 1:2 and lubricant systems E, G, I, and H were added to HDPE-Pine composites and processed at a feed rate of 18 kg/hr. The control lubricant and lubricant systems E, G, I, and H were tested at concentrations of 2 phc, 3 phc, and 4 phc in HDPE-Pine composites. FIG. 7 shows the effect of lubricant concentration on process ease. The process ease values for lubricant systems E, G, I, and H were higher at all concentration levels than for the control lubricant. In fact, a 2 phc loading of any of the lubricants of the present invention resulted in a better process ease than the current commercial lubricant at all the additive levels tested. Furthermore, the appearance of the extruded parts was better with the lubricants of the present invention that for those using the control lubricant at any loading concentration.

Figure 8:
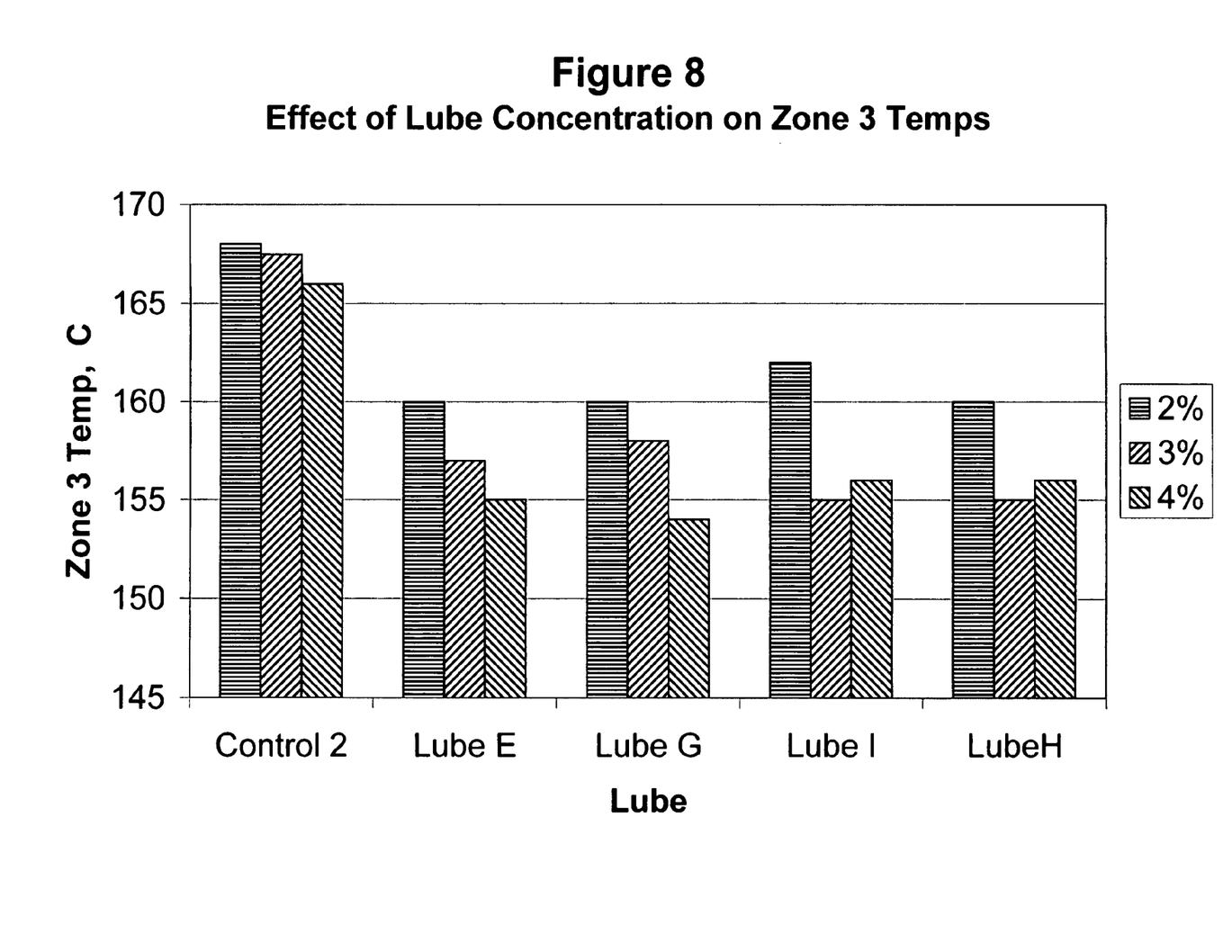
FIG. 8 shows the effect of Lubricant Systems E, G, I and H in a HDPE/pine flour composite on zone 3 temperatures.

The zone 3 temperatures measured during the above run are shown in FIG. 8. The zone 3 temperatures are lower at all loading of the lubricants of the present invention than for the control lubricant at any loading. As with the process ease, the maximum temperature is better (lower) at the lowest loading of the lubricants of the present invention than the control lubricant even at their highest loading.

EXAMPLE 3

The process of the present invention was carried with an extrudable composition containing straw (an agricultural residue). An extrudable composition containing 60% straw strained through a 40 mesh screen and 40% HDPE without any lubricant was extruded. The extruded product was not coherent.

The procedure was repeated with 3 phc each of EBS and ZnSt, mixed separately. The product produced was coherent. These data show that a composite containing an agricultural waste product, EBS and ZnSt form a viable product which can be extruded to make lumber-like products.

All patents, applications, articles, publications and test methods mentioned above are hereby incorporated by reference.

Many variations of the present invention will suggest themselves to those skilled in the art in light of the above detailed description. Such obvious variations are within the full intended scope of the appended claims.

What is claimed:

1. A polymer-cellulosic fiber composition comprising from about 30 to about 70 wt.% polyolefin polymer admixed with about 70 to about 30 wt.% cellulosic fiber and from about 2 to about 7 wt.% lubricant selected from the group consisting of ethoxylated esters of hydantoins, ethoxylated esters of sorbitol and sorbitan, and ethylene bisamides of fatty acids containing 6–10 carbons, and combinations thereof.

2. The polymer-cellulosic fiber composition of claim 1, wherein the polymer is a high-density polyethylene.

3. The polymer-cellulosic composition of claim 1, wherein the cellulosic fiber is oak, pine, maple, straw, corn stalks, rice hulls, wheat, oat, barley and oat chaff, coconut shells, peanut shells, walnut shells, jute, hemp, bagasse, bamboo, flax, kenaff, or a combination thereof.

4. The polymer-cellulosic fiber composition of claim 1, wherein about 40 to about 60 wt. % of the cellulosic fiber is present in the composition.

5. The polymer-cellulosic composition of claim 1, wherein about 2 to about 4 wt. % of the lubricant is present in the composition, the polymer is a high-density polyethylene and the cellulosic fiber is pine flour.

6. The polymer-cellulosic composition of claim 1, wherein about 3 to about 6 wt. % of the lubricant is present in the composition, the polymer is a high-density polyethylene and the cellulosic fiber is oak flour.

7. The polymer-cellulosic composition of claim 1, wherein about 40 to about 60 wt. % of the polymer is present in the composition.

8. The polymer-cellulosic composition of claim 1, further comprising from about 2% to about 10% talc.

9. A process for the preparation of a polymer-cellulosic fiber plastic composite, comprising:
mixing from about 30 to about 70 wt. % polymer, from about 70 to about 30 wt. % cellulosic fiber, and from about 1 to about 7 wt.% lubricant to form a mixture;
wherein said lubricant is selected from the group consisting of ethoxylated esters of hydantoins, ethoxylated esters of sorbitol and sorbitan, ethylene bisamides of fatty acids containing 6–10 carbons, and combinations thereof;
drying the mixture obtained in step (a) for about 10 to about 16 hours at about from 100 to about 120° C. under a vacuum of between about 680 to about 720 mm Hg;
extruding the mixture obtained in step (b) at a temperature not more than about 170° C.;
passing the extruded profile through a cooling chamber containing a plurality of water sprays; and
cutting and collecting the extrudate.

10. The process according to claim 9, wherein the cellulosic fiber is oak, pine, maple, straw, corn stalks, rice hulls, wheat, oat, barley and oat chaff, coconut shells, peanut shells, walnut shells, jute, hemp, bagasse, bamboo, flax, kenaff, or a combination thereof.

11. The process of claim 10 wherein the cellulosic fiber is screened to obtain a mixture of fibers having varying sizes in the range of about 10 to about 100 mesh.

12. The process according to claim 9, wherein the polymer is high-density polyethylene.

13. The process according to claim 9, wherein about 40 to about 60 wt. % of the cellulosic fiber is present in the polymer-cellulosic composite.

14. The process according to claim 9, wherein about 60 to about 40 wt. % of the polymer is present in the polymer-cellulosic composite.

15. The process according to claim 9, wherein about 2 to about 4 wt. % of the lubricant is present in the polymer-cellulosic composite, the polymer is a high-density polyethylene and the cellulosic fiber is pine flour.

16. The process according to claim 9, wherein about 3 to about 6 wt. % of the lubricant is present in the composite, the polymer is a high-density polyethylene and the cellulosic fiber is oak flour.

17. A composition prepared by the process comprising:
mixing from about 30 to about 70 wt. % polyolefin polymer, from about 70 to about 30 wt. % cellulosic fiber, and from about 2 to about 7 wt. % lubricant to form a mixture;
wherein said lubricant is selected from the group consisting of ethoxylated esters of hydantoins, ethoxylated esters of sorbitol and sorbitan, ethylene bisamides of fatty acids containing 6–10 carbons, and combinations thereof;
drying the mixture obtained in step (a) for about from 10 to about 16 hours at from about 100 to about 120° C. under a vacuum of between about 680 to about 720 mm Hg;
extruding the mixture obtained in step (b) at a maximum temperature of about 170° C.;
passing the extruded profile through a cooling chamber containing a plurality of water sprays; and
cutting and collecting said extrudate profile.

18. The composition according to claim 17, wherein the cellulosic fiber is oak, pine, maple, straw, corn stalks, rice hulls, wheat, oat, barley and oat chaff, coconut shells, peanut shells, walnut shells, jute, hemp, bagasse, bamboo, flax, kenaff, or a combination thereof.

19. The composition according to claim 17, wherein the cellulosic fibers are screened to obtain a mixture of fibers having varying sizes.

20. The composition according to claim 17, wherein the polymer is high-density polyethylene.

21. The composition according to claim 17, wherein the lubricant is selected from the group consisting of ethoxylated esters of hydantoins, ethoxylated esters of sorbitol and sorbitan, and ethylene bisamides of fatty acids containing 6–10 carbons.

22. The composition according to claim 17, wherein about 40 to about 60 wt. % of the cellulosic fiber is present in the polymer-wood composite.

23. The composition according to claim 17, wherein about 60 to about 40 wt. % of the polymer is present in the polymer-wood composite.

24. The composition according to claim 17, wherein about 2 to about 4 wt. % of the lubricant is present in the polymer-cellulosic composite, the polyolefinic polymer is a high-density polyethylene and the cellulosic fiber is pine flour.

25. The composition according to claim 17, wherein about 3 to about 6 wt. % of the lubricant is present in the polymer-wood composite, the polyolefinic polymer is a high-density polyethylene and the cellulosic fiber is oak flour.

26. A polymer-cellulosic fiber composition comprising from about 30 to about 70 wt.% polymer admixed with about 70 to about 30 wt.% cellulosic fiber, wherein the cellulosic fiber is selected from the group consisting of oak, maple, straw, corn stalks, rice hulls, wheat, oat, barley and oat chaff, coconut shells, peanut shells, walnut shells, jute, hemp, bagasse, bamboo, flax, kenaff, and combinations thereof, and from about 2 to about 7 wt.% lubricant selected from the group consisting of ethoxylated esters of hydantoins, ethoxylated esters of sorbitol and sorbitan, ethylene bisamides of fatty acids containing 6–10 carbons, and combinations thereof.

27. A composition prepared by the process comprising:
(a) mixing from about 30 to about 70 wt. % polymer, from about 70 to about 30 wt. % cellulosic fiber, and from about 2 to about 7 wt. % lubricant to form a mixture,
wherein the cellulosic fiber is selected from the group consisting of oak, maple, straw, corn stalks, rice hulls, wheat, oat, barley and oat chaff, coconut shells, peanut shells, walnut shells, jute, hemp, bagasse, bamboo, flax, kenaff, and combinations thereof, and
wherein the lubricant is selected from the group consisting of ethoxylated esters of hydantoins, ethoxylated esters of sorbitol and sorbitan, ethylene bisamides of fatty acids containing 6–10 carbons, and combinations thereof; and (b) drying the mixture obtained in step (a) for about 10 to about 16 hours at about 100 to about 120° C. under a vacuum of about 680 to about 720 mm Hg;

(c) extruding the mixture obtained in step (b) at a maximum temperature of about 170° C.

(d) passing the extruded profile through a cooling chamber containing a plurality of water sprays; and (e) cutting and collecting the extrudate profile.

* * * * *